(12) United States Patent
Pitz et al.

(10) Patent No.: US 10,821,725 B2
(45) Date of Patent: Nov. 3, 2020

(54) DEVICE FOR IMAGING AND/OR VARNISHING THE SURFACES OF OBJECTS

(71) Applicant: HEIDELBERGER DRUCKMASCHINEN AG, Heidelberg (DE)

(72) Inventors: Heiner Pitz, Weinheim (DE); Alexander Matern, Oftersheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/434,266

(22) Filed: Jun. 7, 2019

(65) Prior Publication Data

US 2019/0283404 A1 Sep. 19, 2019

Related U.S. Application Data

(62) Division of application No. 15/007,851, filed on Jan. 27, 2016, which is a division of application No. (Continued)

(30) Foreign Application Priority Data

Sep. 5, 2012 (DE) .................. 10 2012 017 538

(51) Int. Cl.
*B41J 2/045* (2006.01)
*B41F 17/00* (2006.01)
(Continued)

(52) U.S. Cl.
CPC ............ *B41J 2/04541* (2013.01); *B05B 1/30* (2013.01); *B05B 12/02* (2013.01); *B05B 12/084* (2013.01);
(Continued)

(58) Field of Classification Search
CPC ...... B41J 11/002; B05B 13/0431; B05B 1/30; B05B 12/02; B05B 12/084; B05C 9/14; B05C 11/1005
See application file for complete search history.

(56) References Cited

U.S. PATENT DOCUMENTS

| 4,844,947 | A | 7/1989 | Kasner et al. |
| 5,732,633 | A | 3/1998 | Herskowits ................ 101/487 |

(Continued)

FOREIGN PATENT DOCUMENTS

| CN | 101706629 A | 5/2010 |
| DE | 37 37 455 A1 | 5/1988 |

(Continued)

OTHER PUBLICATIONS

German Patent and Trademark Office Searc Report, dated May 13, 2013.

*Primary Examiner* — Dah-Wei D. Yuan
*Assistant Examiner* — Stephen A Kitt
(74) *Attorney, Agent, or Firm* — Laurence A. Greenberg; Werner H. Stemer; Ralph E. Locher

(57) ABSTRACT

A device for imaging and/or varnishing the surfaces of objects or vehicles, etc. includes adapting a time lag between an application of fluid and further treatment thereof, such as drying ink or varnish, to a spreading behavior of the fluid during the application thereof. The fluid may be applied to the surface of the object in sections, firstly drying the fluid in individual sections before applying it to the next section.

3 Claims, 6 Drawing Sheets

Related U.S. Application Data

14/018,621, filed on Sep. 5, 2013, now Pat. No. 9,358,780.

(51) Int. Cl.

| | | |
|---|---|---|
| *B05B 12/02* | (2006.01) | |
| *B05B 12/08* | (2006.01) | |
| *B05B 13/04* | (2006.01) | |
| *B05C 9/14* | (2006.01) | |
| *B05C 11/10* | (2006.01) | |
| *B41J 3/407* | (2006.01) | |
| *B41J 11/00* | (2006.01) | |
| *B05C 5/02* | (2006.01) | |
| *B05B 1/30* | (2006.01) | |

(52) U.S. Cl.
CPC ........ *B05B 13/0431* (2013.01); *B05C 5/0212* (2013.01); *B05C 9/14* (2013.01); *B05C 11/1005* (2013.01); *B41F 17/006* (2013.01); *B41J 3/4073* (2013.01); *B41J 11/002* (2013.01)

(56) References Cited

U.S. PATENT DOCUMENTS

| | | | |
|---|---|---|---|
| 6,773,761 B2 | 8/2004 | Cote et al. | |
| 8,342,636 B2 | 1/2013 | Nakano et al. | |
| 2002/0024544 A1 | 2/2002 | Codos | B41J 3/4073 347/8 |
| 2002/0097280 A1 | 7/2002 | Loper et al. | 347/2 |
| 2003/0023762 A1 | 1/2003 | Dhir et al. | |
| 2007/0062383 A1 | 3/2007 | Gazeau et al. | |
| 2008/0079763 A1 | 4/2008 | Abrott | 347/19 |
| 2008/0088689 A1* | 4/2008 | Korem | B41J 11/002 347/102 |
| 2008/0309698 A1 | 12/2008 | Nakano et al. | 347/14 |
| 2009/0167817 A1 | 7/2009 | Orr | B41F 17/006 347/37 |
| 2010/0304009 A1* | 12/2010 | Bausen | B05B 7/2472 427/8 |
| 2011/0262622 A1* | 10/2011 | Herre | B05B 1/14 427/8 |

FOREIGN PATENT DOCUMENTS

| | | |
|---|---|---|
| DE | 3737455 A1 | 5/1988 |
| DE | 103 23 761 A1 | 12/2004 |
| DE | 10323761 A1 | 12/2004 |
| DE | 603 00 061 T2 | 2/2006 |
| DE | 60300061 T2 | 2/2006 |
| DE | 102006035243 A1 | 1/2008 |
| DE | 102012006371 A1 | 7/2012 |
| JP | H0752525 A | 2/1995 |
| JP | 2000238254 A | 9/2000 |
| JP | 2002225256 A | 8/2002 |
| JP | 2003103840 A | 4/2003 |
| JP | 2005313558 A | 11/2005 |
| JP | 2007001248 A | 1/2007 |
| JP | 2009184119 A | 8/2009 |
| JP | 2010051891 A | 3/2010 |
| JP | 2011152768 A | 8/2011 |
| WO | 2004007089 A1 | 1/2004 |
| WO | 2004103581 A1 | 12/2004 |
| WO | 2005084076 A1 | 9/2005 |
| WO | WO 2005084076 A1 | 9/2005 ............ H04R 31/00 |

\* cited by examiner

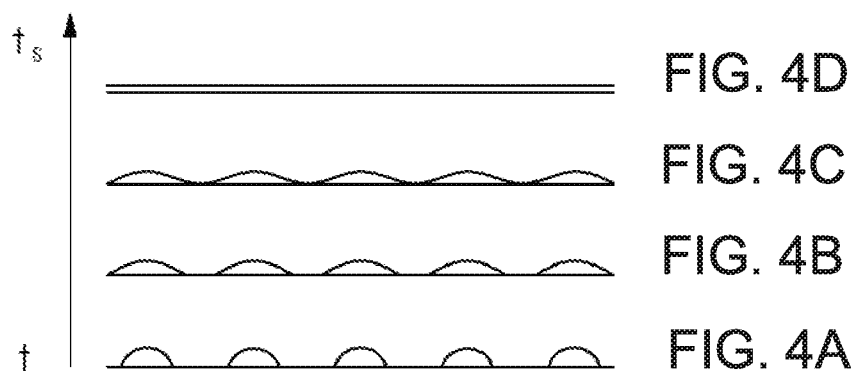
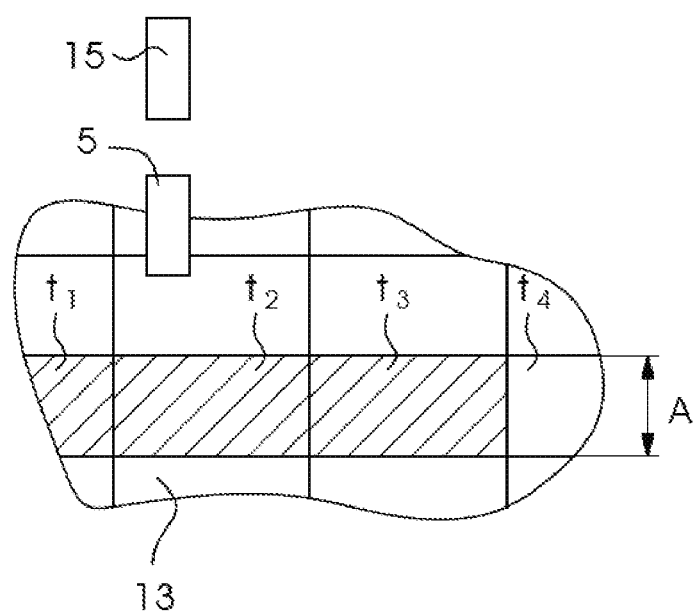

DEVICE FOR IMAGING AND/OR VARNISHING THE SURFACES OF OBJECTS

CROSS-REFERENCE TO RELATED APPLICATION

This application is a Divisional of U.S. application Ser. No. 15/007,851, filed Jan. 27, 2016; which was a Divisional of U.S. application Ser. No. 14/018,621, filed Sep. 5, 2013, now U.S. Pat. No. 9,358,780; the application also claims the priority, under 35 U.S.C. § 119, of German Patent Application DE 10 2012 017 538.8, filed Sep. 5, 2012; the prior applications are herewith incorporated by reference in their entirety.

BACKGROUND OF THE INVENTION

Field of the Invention

The invention relates to a method of treating the surfaces of objects such as vehicles and the like with fluids wherein the fluid is applied by a first tool that is movable in a computer-controlled way and wherein the fluid is subsequently further treated, for example dried, cured, or coated with a layer of a material by a second tool that is movable in a computer-controlled way. Such a method is described, for example, in German Patent Application DE 37 37 455 A1, corresponding to U.S. Pat. No. 4,844,947. In the known method, bodies of automobiles are varnished, potentially with multiple colors, by using a spray nozzle system fixed to the end of a robot arm, and are subsequently cured by UV radiation. The aforementioned publication further discloses successively curing applied fluids of different colors.

Inkjet print heads do not readily lend themselves to printing high-resolution halftone images on one hand and deep solid areas on the other. The ink of the individual printing dots of a color separation needs to converge for the solid areas. That process requires a certain minimum amount of time. However, if the ink is dried too late, blurred outlines will result or, especially if the object to be imaged is oriented in the vertical, downwardly directed ink accumulations that are detrimental to the visual impression of the image may form due to gravity. In the case of ink systems that do not dry automatically but are dried or cured by radiation such as infrared or UV radiation, or by hot air, especially on non-absorbent substrates, a window of processing time needs to be considered within which the ink may spread and form the desired continuous solid tone area.

That window of processing time is dependent on the substrate of the object to be imaged, for example on the surface energy, the absorbency, the current condition, the question as to whether it has been pretreated using primers or plasma treatment, etc., and on the ink itself, i.e. its viscosity and surface tension. In industrial UV inkjet printing at resolutions of approximately 200 to 600 dpi, spreading times in the range of seconds are common.

The production speeds for imaging surfaces using inkjet systems have advanced to regions wherein the distance between the inkjet print heads and the downstream radiation sources for drying or pin-curing the ink may amount to several decimeters. When flat surfaces are being printed, especially if the substrate is being moved, such distances can be accommodated. With robot-guided printing systems for imaging extremely curved or irregular object surfaces, however, the situation is different as it becomes rather difficult or even impossible to program a path that meets the requirement of maintaining the operating distance for the individual nozzles of the inkjet head and for the dryer tool following at a fixed distance, while at the same time avoiding collisions with the surface of the object to be imaged.

BRIEF SUMMARY OF THE INVENTION

It is accordingly an object of the invention to provide a device for imaging and/or varnishing the surfaces of objects, which overcome the hereinafore-mentioned disadvantages of the heretofore-known methods and devices of this general type and which apply even solid areas of fluids to be further treated to non-planar objects in a visually appealing way using inkjet print heads.

With the foregoing and other objects in view there is provided, in accordance with the invention, a method of treating surfaces of objects or vehicles, etc. with fluids. The method comprises applying a fluid using a first tool having a computer-controlled movement, subsequently further treating the fluid using a second tool having a computer-controlled movement, and adapting a time lag, between the steps of applying the fluid to the object and subsequently further treating the fluid, to a spreading behavior of the fluid.

With the objects of the invention in view, there is concomitantly provided a device for carrying out the method according to the invention, comprising a control computer operating one or simultaneously two path controls for an application tool and a further treatment tool, and a memory in which the path(s) to be controlled and displacement speeds are stored in such a way that a time lag adapted to a spreading behavior of the fluid to be applied results for locations that the two tools successively pass.

In accordance with the invention, the tools for the application of the fluid and for the further treatment of the fluid, which may be movable by a robot under the control of a computer, for example, are passed over the object to be imaged with a time lag that is adapted to the spreading behavior of the fluid and is preferably kept constant. However, it is likewise possible to vary the time lag as a function of the inclination of the surface portions to be imaged, for example, to account for the effects of gravity, i.e. to envisage a shorter time lag for vertical surface portions than for horizontal surface portions, if no provision is made for the surface to be imaged to be substantially horizontal at the instant of imaging by accordingly orienting the object to be imaged.

The term "treatment" or "further treatment" of the fluid is understood to include all processes that actively modify the properties of the fluid in any way. The term "drying" is understood to include all forms of active drying, i.e. drying by using infrared radiation or hot air, curing by UV or electron radiation and so-called "pin curing," a process in which the ink is only partly dried in a first step and finally cured all through in a second step.

It may be expedient to provide two separate motion systems or robot arms for the application of the fluid and the further treatment of the fluid to implement a simultaneous, yet offset movement of the tool for the application of the fluid on one hand and of the tool for the further treatment on the other hand. Due to the separate actuation of the two tools, collisions with the surface may then be avoided even if the object is irregular.

A system wherein the tool for the application of the fluid is attached to the end of the first manipulator, i.e. robot arm, for example, and the tool for the further treatment is directly movably attached thereto through one or more further axes is furthermore advantageous. In this way it is possible, for example, to set the distance between the tools and, if required, the path for the follower movement within certain limits. Thus, for a known motion speed, the time lag between the application of the fluid and its further treatment, i.e. the drying of the fluid, may be set in accordance with the spreading time by using the distance between the tools even without an entire second robot arm. However, it is particularly advantageous if the application and the further treatment occur intermittently with a time lag between the movement of the first tool and the movement of the second tool, for in this case a single robot arm in intermittent operation may successively guide both tools over the surfaces to be imaged. The application of the fluid to the surface of the object is then expediently done in sections having a size and position which may be taken into account even when the sequence of motions of the movable tools is being planned, while also taking into account the printing speed and the time lag, which is adapted to the spreading behavior of the fluid.

In accordance with this alternative of the method, too, a single manipulator system for the tool for applying the fluid and the tool for the further treatment is sufficient, i.e. only one robot is needed to apply solid tone areas to the object in question. This alternative permits accurate maintenance of the respective optimum operating distance for each tool despite curved surfaces, at all times. The robot may include linear guides or rotary/pivot joints or combined rotary and linear axes.

In accordance with this alternative of the method, too, inks of different colors may individually or jointly be applied to the surface of the object by an inkjet head. For example, initially, the inks are individually applied and subsequently dried in each section before the next section is imaged. Alternatively, one ink is applied and dried in multiple sections before the next ink is applied and dried, likewise in sections, after imaging a larger area of the surface of the object in multiple sections. It is likewise possible to simultaneously apply all inks in one section of the surface and then to jointly dry them before moving on to the next section.

When applying and drying inks in sections, it is furthermore expedient to adapt the sections to geometric characteristics of the surface to be imaged. For example, if the length of the solid area to be imaged is 450 mm, although 500 mm can be imaged in view of the spreading time and the printing speed, the imaging will nevertheless be terminated at the border of the image element and the drying process will be started, potentially with a short time lag, to prevent the successively imaged sections within the image from adjoining each other, or the end points of the sections to be imaged will be placed between two letters if solid-area numbers or letters are to be created.

Within certain limits, it is even possible and expedient to increase the printing speed and/or the return speed in such a way that for a spreading time that is to be maintained to be as constant as possible for the ink, the length of the image section to be covered coincides with the borders of the respective image or area portion in order to avoid a seam between the individual imaging and drying sections within the image.

The measures described above may in general be applied to optimize the duration of the entire process.

The spreading time, too, may be varied to a certain extent within a print job. Usually, variations of 10% are uncritical, variations of 20% are frequently still invisible and variations of +/−50% are often tolerable. While being adapted to the spreading time, the variation of the time lag between the application of the ink and the curing may also depend on the properties of the surface of the object, i.e. whether it is more or less absorbent or whether it is primed metal or glass, and on the alignment of the surface elements relative to the vertical.

It is likewise possible to determine the spreading time during the surface treatment process, to calculate the resultant time lag, and to use it for an online closed-loop control. This may be achieved, for example, by monitoring the spreading behavior of applied fluid dots or areas by using a camera and by an online evaluation in terms of how long it takes for the applied fluid dot or area to reach a pre-defined size. The result will then be fed back into the control loop for the displacement speed and the time lag between application of the ink, for example, and the drying.

Other features which are considered as characteristic for the invention are set forth in the appended claims.

Although the invention is illustrated and described herein as embodied in a method and a device for imaging and/or varnishing the surfaces of objects, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 4A-4D are diagrams of jetted inkjet droplets shown in FIG. 3 at various spreading stages;

FIG. 5 is an enlarged side-elevational view of a surface shown in FIG. 3;

DESCRIPTION OF THE INVENTION

Figure 1:
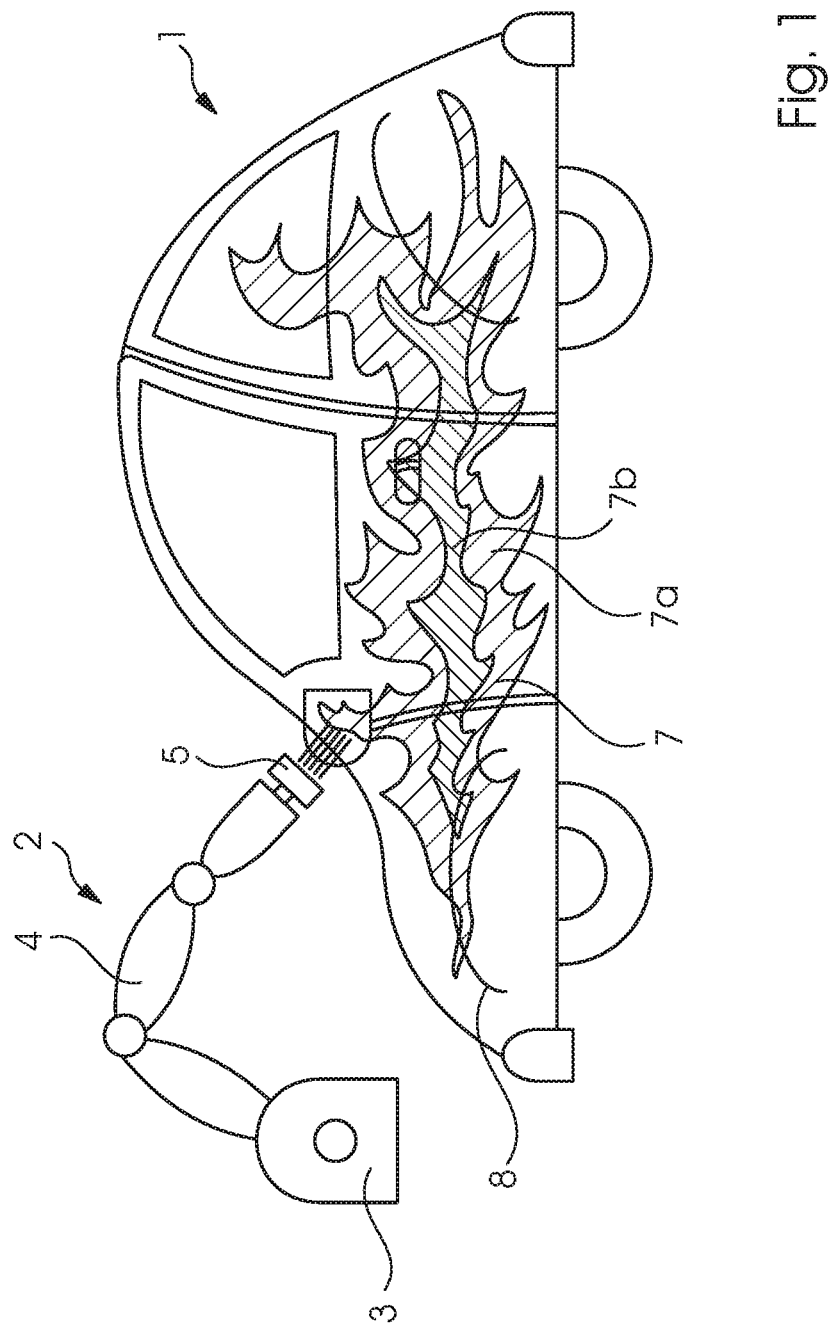
FIG. 1 is a diagrammatic, side-elevational view of a preferred exemplary embodiment of the invention on the basis of an articulated robot printing on a vehicle.

Referring now to the figures of the drawings in detail and first, particularly, to FIG. 1 thereof, there is seen a side view of a vehicle 1 to be printed on with the aid of an articulated robot 2. The articulated robot 2 has a base 3 and a robot arm 4 formed of multiple movable members. A print head 5 is attached to an end of the robot arm 4. The base 3 may be rotatable and movable in such a way as to ensure that the arm 4 carrying the print head 5 may reach every spot of the vehicle 1. If necessary, the vehicle may be supported by a non-illustrated support, which may be used to rotate the vehicle about the vertical or tilt it about a horizontal axis.

During printing, the print head 5 is only a short operating distance from the surface of the vehicle 1 and jets droplets of ink at a sufficiently high impulse for them to hit the surface of the vehicle 1 and adhere thereto. In the given example, an image 7 is printed onto the vehicle 1. The image 7 may include different areas 7a and 7b, which may differ, for example, in that they have different colors. They may also differ in that one is a screen area to be able to print halftones of different intensity and one area is solid tone to obtain a continuous surface.

The vehicle 1, as the object to be printed, has a curved surface, for example a fender 8 that bulges out from a side wall, having both convex and concave curves. The curves may have a very small radius and may take the shape of bends. It is even possible to print larger, extended areas of the surface of the vehicle 1 in one color, which approximately amounts to varnishing it. However, the vehicle has preferably been varnished before, and the image is locally applied as an embellishment or as a way to convey information, for example an advertisement containing letters to convey text.

The manner of imaging such a vehicle body is described, for example, in detail in German Patent Application DE 10 2012 006 371 A1, filed Mar. 29, 2012, which relates to a method for printing on an object, is owned by the Applicant of the instant application and is incorporated herein by reference in its entirety.

Figure 2:
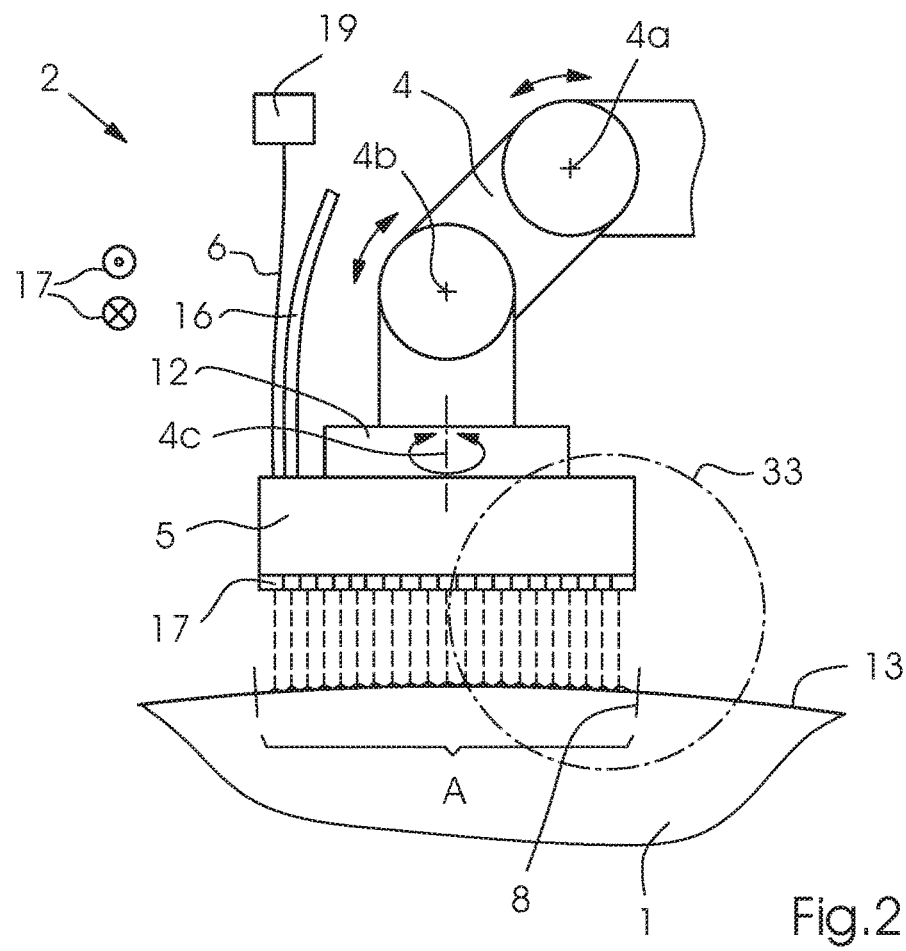
FIG. 2 is an enlarged, fragmentary, side-elevational view of a print head of FIG. 1 attached to an end of a robot arm.

The print head 5, which is shown in more detail in FIG. 2 and which may eject UV ink droplets at a frequency of 40 kHz, may be a print head marketed under the trademark "Spectra Galaxy ja256/80 AAA" by Fuji Dimatix Inc., located in Lebanon, New Hamshire. It has 256 nozzles 17. The print head 5 is received on an articulated arm 4 of a robot, for example of the KR60-3 type by the Kuka Company located in Germany. In the illustrated example, the robot arm 4 has three joints 4a, 4b and 4c, through the use of which the robot 2 moves the print head 5 across a surface 13 of the object 1. The print head 5 is further connected to an ink supply container through an ink line 16 on one hand and to a computer 19 through a data connection 6 on the other hand. The lines or connections 6, 16, which are only diagrammatically shown, may include multiple individual ink supply lines or signaling lines for controlling the individual nozzles 17 of the inkjet print head 5.

In the position shown in FIG. 2, the print head 5 prints a section that has a width A on the surface 13 of the object 1. In the process, the robot moves the print head 5 into the plane of the drawing or out of the plane of the drawing, for example.

Figure 3:
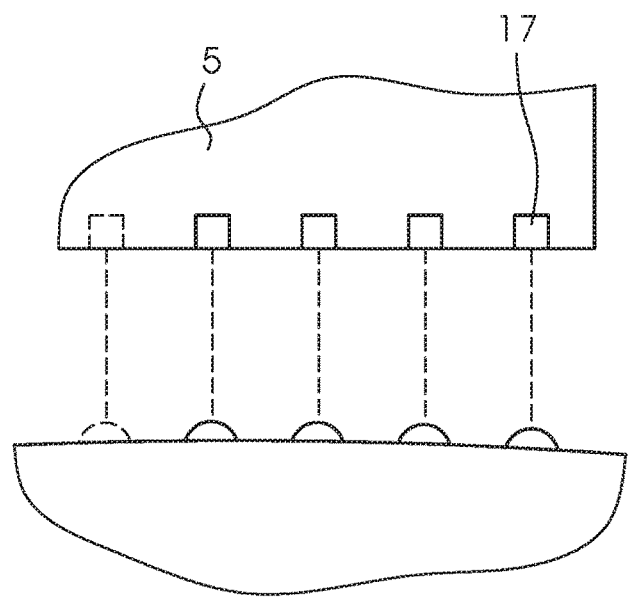
FIG. 3 is a further enlarged side-elevational view of a region 33 of FIG. 2.

As is apparent from the enlarged view of FIG. 3, immediately after hitting the surface 13 of the vehicle 1, which may be varnished, for example, the ink droplets expelled by the nozzles 17 of the print head 5 are located next to each other on the surface 13 without contacting or directly adjoining each other. Depending on the viscosity and surface tension of the ink and the surface tension or surface energy of the surface to be printed, a certain amount of time amounting to several seconds, for example between five and ten seconds, may pass until an even or uniform layer of ink forms in those areas in which the print head 5 was to print a solid area. This condition is shown in FIG. 4D at a point in time $t_S$, which is considered the optimum spreading time. If one was to wait any longer before drying the ink, the ink would potentially continue to spread at the edges of the image, resulting in blurred contours that have a negative visual effect, for example in lettering.

In accordance with a first alternative of the invention, in order to dry the jetted ink, a provision is made for the print head 5 to be "followed," so to speak, by a radiation source mounted to the articulated arm of a second robot (otherwise not illustrated in the figures) that is disposed next to or behind the robot 2. While taking into account the speed, the radiation source is made to follow the print head 5 on the same path or on a path that is offset to account for different operating distances of the print head and of the radiation source in such a way that the print head 5 and the radiation source pass over the same locations on the surface 13 at a time delay corresponding to the optimum spreading time $t_S$.

Since independent motion systems, i.e. two robots, are used to move the print head 5 and the radiation source, even very curved and irregular object surfaces may be printed and dried without any collision with the surface of the object.

The second alternative of the method of the invention envisages the use of only one robot as will be explained with reference to FIG. 5. In this case, the solid area to be printed onto the surface 13 by the print head 5 is divided into individual strips adjoining each other and having a width A corresponding to the width of the print head. Each strip is in turn divided into individual sections having a length $t_1$, $t_2$, $t_3$, etc. The method proceeds as follows: the robot 2 initially passes the print head 5 over section $t_1$, for example, having a length which is selected to ensure that, taking into account the printing speed, the return speed, and the time for positioning a radiation source 15 for drying the printing ink, the optimum spreading time $t_S$ elapses before the radiation tool 15 for drying the printing ink is subsequently passed over the same section at an approximately identical speed and in the same direction. Then the print head 5 is returned to the operating position to print and then dry section $t_2$, then section $t_3$ is first printed, then dried and so on.

In this way, using only one robot, a larger portion of the surface 13 of the object is continuously imaged without excess spreading and blurring.

If the solid areas in sections $t_1$, $t_2$, $t_3$, . . . are to be built up out of multiple different basic colors different from the basic colors CMYK, the imaging and drying for each color in a section $t_1$, $t_2$, $t_3$, . . . viewed by itself is done intermittently. In some cases, the print head on the end of the robot arm 4 is to be changed between the individual applications of ink in different colors.

A very similar process can be applied if, for example, a white primer is applied prior to the application of ink or if a clear varnish is applied after imaging.

A robot arm suitable for the purpose described above is shown in FIGS. 6A-6C. A mounting plate 12 is fixed to the end of the robot arm 4. Three different tools jutting out in different directions are mounted to the mounting plate 12. A tool 26 is used for generating a plasma discharge to pretreat the surface to improve ink reception qualities. Reference numeral 5 indicates a four-color inkjet print head, which is only diagrammatically shown and may include ink supply lines and signaling lines located inside or outside the mount. Reference numeral 15 denotes an ultraviolet radiation source that has approximately the same width as the inkjet print head 5. Due to a robot axis 4c, the three different heads may be successively rotated into an aligned position relative to the surface 13 of the object to be printed. When the path of the robot arm 4 is planned, the entire sequence of motions for pretreating, printing and curing the ink on the surface 3 of the object is stored. This sequence may include the steps of initially pretreating the entire surface 13 using the processing head or tool 26 (e.g. plasma treatment) and applying UV radiation, IR radiation, or radiation in the visible range or subjecting it to corona treatment or hot-air treatment.

Figure 6A:
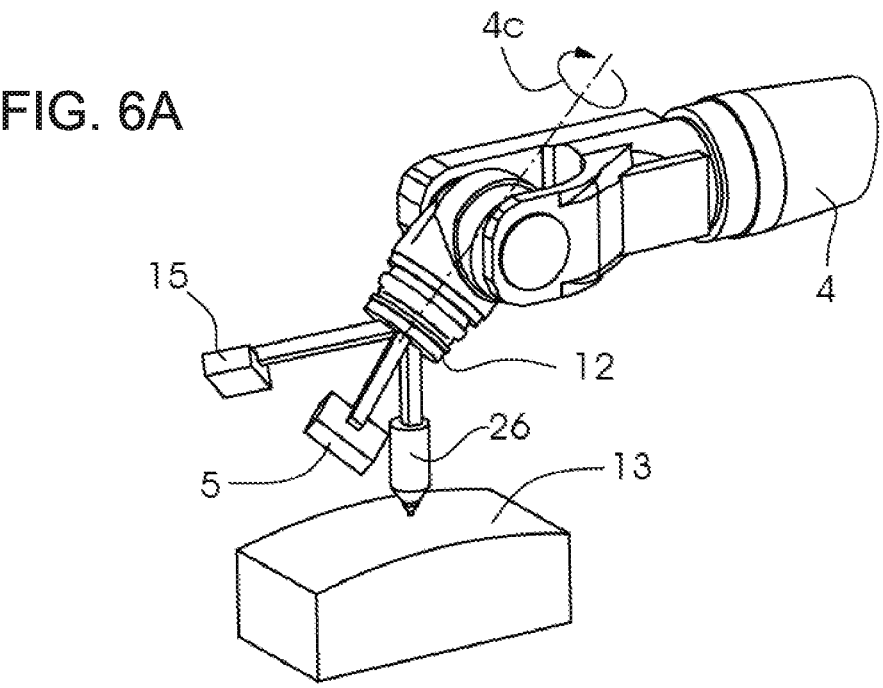
FIGS. 6A-6C are enlarged perspective views of an end of an articulated arm shown in FIG. 4.
Figure 6B:
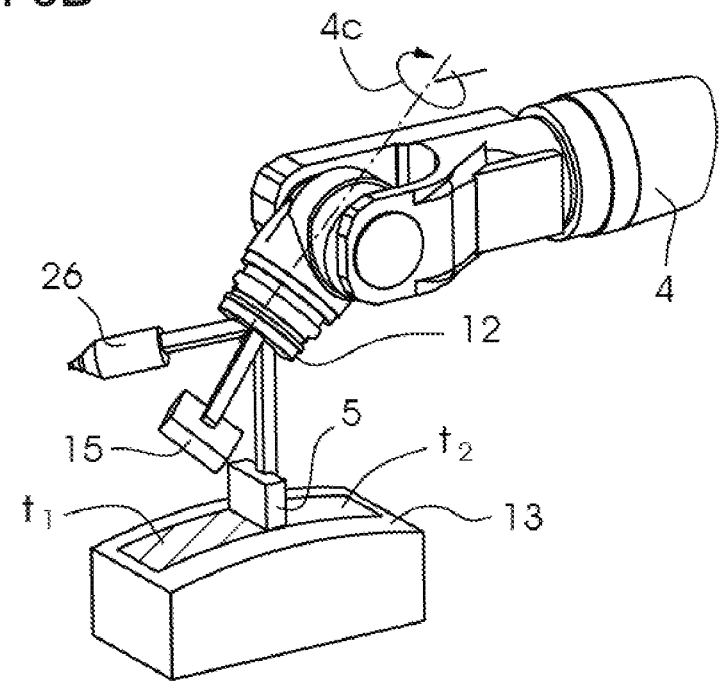
Figure 6C:
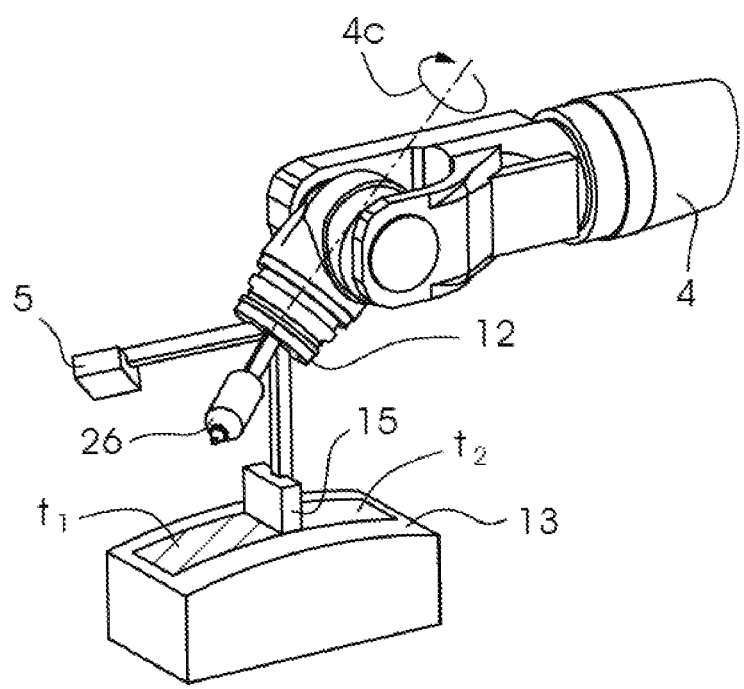

This stage is shown in FIG. 6A. Then the print head 5 is rotated into the operating position to print a first color such as black or cyan onto section $t_1$ of the surface 13 (FIG. 6B). In the illustrated position, the robot arm stops its sequence of motions, moves to the beginning of section $t_1$, where it rotates the UV radiation source 15 into the operating position and subsequently passes over section $t_1$ to dry the ink in this section (FIG. 6C). Then the robot arm 4 returns to the beginning of section $t_1$ and rotates the inkjet head 5 back into position to apply the next color to section $t_1$ and subsequently to cure the ink and so on. When all of the inks required for section $t_1$ have been printed and cured, the sequence is repeated in section $t_2$, etc. until the desired image is provided on the entire surface 13.

In accordance with an alternative of the method, it is possible to successively print one color onto sections $t_1$, $t_2, \ldots$, to intermittently dry the corresponding ink in sections, and then to return to section $t_1$ to start with the next color. However, if larger areas of the surface 13 are imaged in this way, the position of the tools at the end of the robot arm will have to be recalibrated to ensure that the different colors are printed on top of each other in register.

Figure 7A:
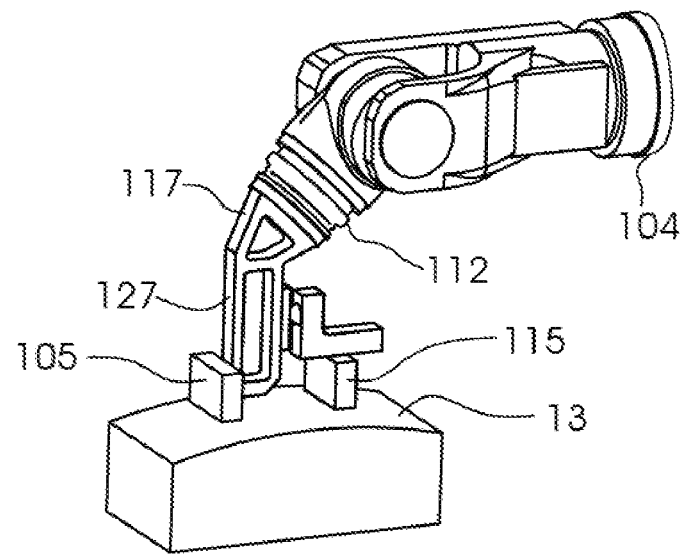
FIGS. 7A and 7B are perspective views of two different enlargements of an end of an alternative structure of the articulated arm.
Figure 7B:
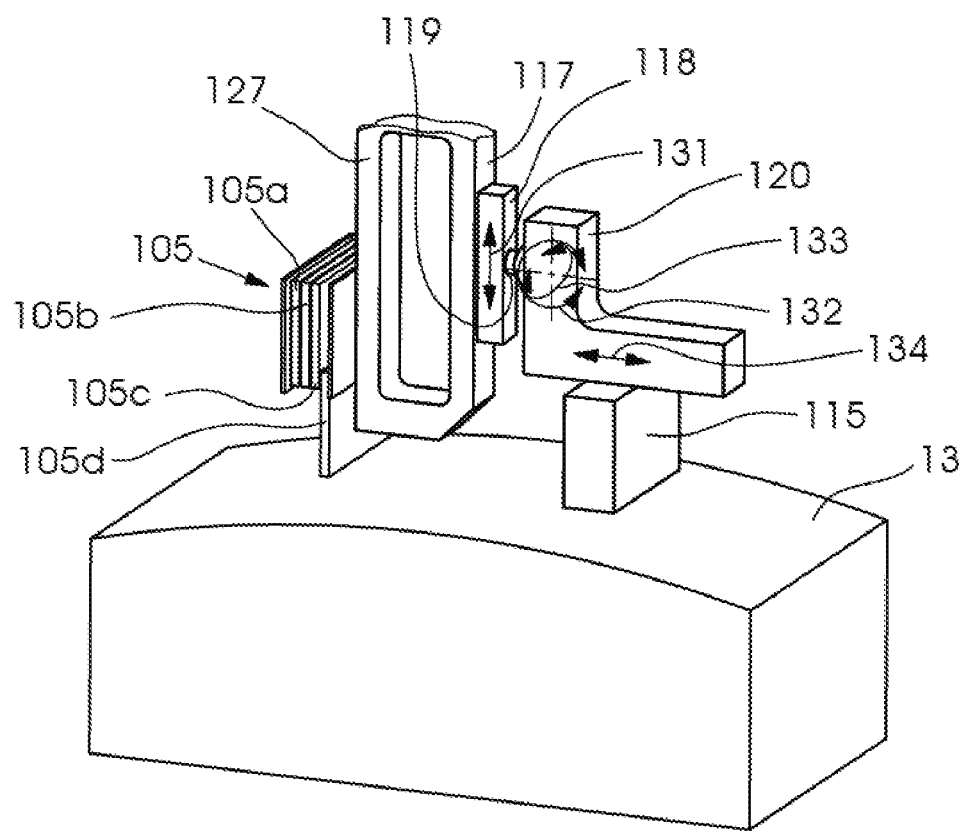

A further exemplary embodiment of a robot arm suitable for carrying out the method of the invention is shown in FIGS. 7A and 7B. In this case, a mounting plate 112 attached to an end of a robot arm 104 carries a carrier structure 117 to which an application tool 105 and a further treatment tool 115 are attached in a manner that becomes apparent from the detailed view in accordance with FIGS. 7A and 7B. The application tool 105 is a four-color inkjet print head formed of four individual print heads 105*a*, 105*b*, 105*c*, 105*d*. Using guides that are not illustrated in any detail herein, each of these individual print heads may be slid towards the surface 13 to be imaged in a direction parallel to a bar 127 of the carrier structure 117. An advantage of this feature is that the inkjet print heads 105*a* to 105*d* may be moved into narrow recesses, corrugations, etc. to reach surface areas therein while maintaining the minimum distances required for sharp images. The treatment or dryer tool 115 does not have to meet this requirement to the same extent because sufficient energy density may also be achieved by an extended exposure time or by increasing the intensity of the radiation.

The dryer tool 115 is connected to the carrier structure 117 and thus also to the application tool, i.e. the inkjet heads 105*a* to 105*d*, by multiple adjustable movement axes indicated by arrows 131 to 134. An L-shaped carrier 120 is movably supported about an articulated joint 119 by a first carriage 118, which is movable along a (not further illustrated) guide on the carrier structure 117 in the direction of the surface 113 to be treated as indicated by the arrow 131. On its underside, the L-shaped carrier 120 is equipped with a (otherwise non-illustrated) linear guide along which the dryer tool 115 may be moved in the direction of the inkjet heads 105*a* to 105*d*. In this way, the distance and thus taking into account the moving speed of the carrier 117 attached to the robot arm 104, the time lag between the imaging of the surface 13 by one of the four inkjet heads 105*a* to 105*d* and the subsequent drying with the aid of an UV lamp, for example, that is received in the dryer tool 115 may be adjusted. The combined rotary/pivoting movements indicated by the arrows 132 and 133 and made possible by the articulated joint 119 and the movement of the carriage 118 allow only one robot arm 104 to move the carrier 120 over the surface 13 in such a way that the dryer tool 115 follows the imaged strip created by the inkjet heads 105*a* to 105*d* without contact. For this purpose, one needs to take into account drives (not illustrated in FIG. 7*b*) for the movement axes 131 to 134 and positions thereof when the path of the robot arm 104 is being planned.

The invention claimed is:

1. A device for treating surfaces of objects, including vehicles, with fluids, the device comprising:
   a robot arm having an end;
   a removable receiving element supported on said end of said robot arm, said removable receiving element being a revolving head having an axis of rotation implemented by an existing robot axis or by a virtual axis created from movements about multiple axes;
   a print head attached to said revolving head and configured to apply a fluid to the object in an operating position;
   a radiation source attached to said revolving head and configured to further treat the fluid in said operating position subsequent to application;
   said revolving head alternately moving said print head and said radiation source into said operating position;
   a control computer operating one path control or simultaneously operating two path controls for said print head and said radiation source and said control computer moving said print head and said radiation source into operating positions in accordance with a rhythm adapted to a spreading time of ink; and
   a memory storing said path or paths to be controlled and storing displacement speeds to provide a time lag between applying the fluid and subsequently further treating the fluid, said time lag being adapted to a spreading behavior of the fluid for locations being successively passed by said print head and said radiation source.

2. The device according to claim 1, wherein said revolving head additionally carries and moves at least one of a tool for pretreating the surface to be imaged or further ink print heads into said operating position.

3. The device according to claim 1, wherein said robot arm is an articulated arm robot.

* * * * *